United States Patent [19]

Stein et al.

[11] Patent Number: 6,025,317
[45] Date of Patent: Feb. 15, 2000

[54] POWDERY POROUS POLYMERS CONTAINING N-VINYLIMIDAZOL UNITS, PROCESS FOR THEIR PREPARATION AND THEIR USE

[75] Inventors: Stefan Stein, Saulheim; Dieter Boeckh, Limburgerhof; Christian Schade, Ludwigshafen; Gerhard Rössler, Neuhofen, all of Germany

[73] Assignee: BASF Aktiengesellschaft, Ludwigshafen, Germany

[21] Appl. No.: 09/029,075

[22] PCT Filed: Aug. 29, 1996

[86] PCT No.: PCT/EP96/03795

§ 371 Date: Mar. 3, 1998

§ 102(e) Date: Mar. 3, 1998

[87] PCT Pub. No.: WO97/09359

PCT Pub. Date: Mar. 13, 1997

[30] Foreign Application Priority Data

Sep. 5, 1995 [DE] Germany ............... 195 32 718

[51] Int. Cl.[7] ............... C08F 126/06; B01J 39/20
[52] U.S. Cl. ............... 510/360; 510/299; 510/361; 510/475; 510/476; 510/500; 521/149; 525/281; 526/258; 526/263
[58] Field of Search ............... 510/475, 476, 510/360, 361, 299, 500; 521/149; 525/281; 526/258, 263

[56] References Cited

U.S. PATENT DOCUMENTS

| | | | |
|---|---|---|---|
| 3,689,439 | 9/1972 | Field et al. | 521/119 |
| 4,451,582 | 5/1984 | Denzinger et al. | 521/38 |
| 4,478,976 | 10/1984 | Goertz et al. | 525/54.1 |
| 4,576,973 | 3/1986 | Keil et al. | 521/149 |
| 5,622,926 | 4/1997 | Schade et al. | 510/340 |
| 5,627,151 | 5/1997 | Detering et al. | 510/475 |
| 5,710,118 | 1/1998 | Busch et al. | 510/360 |
| 5,710,119 | 1/1998 | Busch et al. | 510/360 |
| 5,795,926 | 8/1998 | Niessner et al. | 523/339 |
| 5,804,543 | 9/1998 | Wertz et al. | 510/303 |
| 5,804,662 | 9/1998 | Schade et al. | 525/262 |
| 5,830,844 | 11/1998 | Detering et al. | 510/475 |
| 5,846,924 | 12/1998 | Detering et al. | 510/475 |
| 5,849,684 | 12/1998 | Donoghue et al. | 510/513 |

*Primary Examiner*—Yogendra Gupta
*Assistant Examiner*—Dawn L. Garrett
*Attorney, Agent, or Firm*—Oblon, Spivak, McClelland, Maier & Neustadt, P.C.

[57] ABSTRACT

Porous polymers which are in powder form and contain N-vinylimidazole units and which are obtainable by free-radical precipitation polymerization of a) 5–100% by weight of at least one N-vinylimidazole of the formula

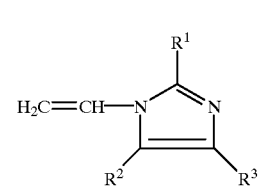

(I)

where $R^1$, $R^2$ and $R^3$ are identical or different and are H, $C_1$–$C_4$-alkyl, N-vinylaxazolidone, N-vinyltriazole, 4-vinylpyridine N-oxide or mixtures of said monomers, b) 0–95% by weight of other copolymerizable monoethylenically unsaturated monomers and c) 0–50% by weight of at least one monomer with at least two non-conjugated ethylenic double bonds in aqueous solution which contains 0.5–30% by weight of at least one electrolyte and, based on the monomers employed, 0.5–80% by weight of at least one surfactant, a process of the preparation thereof, and the use of the porous polymers.

10 Claims, No Drawings

POWDERY POROUS POLYMERS CONTAINING N-VINYLIMIDAZOL UNITS, PROCESS FOR THEIR PREPARATION AND THEIR USE

BACKGROUND OF THE INVENTION

1. Field of the Invention

The invention relates to porous polymers which are in powder form and contain N-vinylimidazole units, to a process for the preparation thereof by free-radical precipitation polymerization of N-vinylimidazoles, and to the use of the polymers as additive to phosphate-free and reduced phosphate detergents for inhibiting color transfer during the washing process.

2. Description of the Background

Polymers of 1-vinylimidazole are prepared, for example, by free-radical polymerization of 1-vinylimidazole in aqueous solution or in alcohols, cf. DE-A-2 814 287. To prepare high molecular weight or crosslinked polymers of 1-vinylimidazole it is possible to employ precipitation polymerization in benzene, cf. EP-A-0 162 388. The polymers result as crosslinked gels.

The use of copolymers of vinylimidazole and vinylpyrrolidone in detergent formulations of various composition is disclosed in EP-A-0 635 563 and EP-A-0 635 566. These copolymers are soluble in water. They are normally isolated by spray-drying aqueous solutions and are used in powder form to produce the detergents. In order to obtain the polymers from the aqueous solutions it is necessary to expend a large amount of energy to evaporate the water.

The older, not prior-published German Patent Application P 44 21 179.1 discloses the use of water-insoluble, crosslinked polymers which are in powder form and contain units of 1-vinylpyrrolidone and/or 1-vinylimidazoles as additive to detergents and cleaners to prevent color transfer during the washing process. The copolymers have a particle size of from 0.1 to 500 µm.

The older, not prior-published DE Patent Application 19 519 328.5 discloses the preparation of crosslinked vinylimidazole/vinylpyrrolidone copolymers in surfactants and the use of the copolymer/surfactant mixtures obtainable in this way in detergents. The removal of the copolymers from the mixture with the surfactants, which are usually liquid or waxy, is very industrially complicated.

U.S. Pat. No. 3,689,439 discloses the preparation of crosslinked polyvinylpyrrolidones by polymerizing N-vinylpyrrolidone with suitable crosslinkers in the presence of free-radical polymerization initiators in aqueous solutions of electrolytes.

The electrolyte content is 5–80% by weight, based on water, and the electrolyte concentration must be high enough for phase separation to occur. This process results in relatively large, usually bead-like, hard particles with a smooth surface. Another disadvantage is that polymer deposits, which are difficult to remove, are formed on the inside wall of the vessel and on the stirrer.

SUMMARY OF THE INVENTION

It is an object of the present invention to provide an improved process for preparing fine-particle polymers which are in powder form and contain imidazole units.

We have found that this object is achieved by porous polymers which are in powder form and contain N-vinylimidazole units and which are obtainable by free-radical precipitation polymerization of a) 5–100% by weight of at least one N-vinylimidazole of the formula

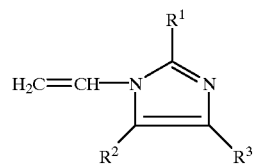

where $R^1$, $R^2$ and $R^3$ are identical or different and are H, $C_1$–$C_4$-alkyl, monomers of the formula

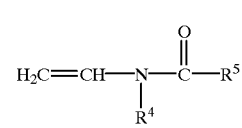

where $R^4$ and $R^5$ are identical or different and are H, $C_1$–$C_4$-alkyl, or together form a ring of 3 to 5 methylene groups, N-vinyloxazolidone, N-vinyltriazole, 4-vinylpyridine N-oxide or mixtures of said monomers, b) 0–95% by weight of other copolymerizable monoethylenically unsaturated monomers and c) 0–50% by weight of at least one monomer with at least two non-conjugated ethylenic double bonds in aqueous solution which contains 0.5–30% by weight of at least one electrolyte and, based on the monomers employed, 0.5–80% by weight of at least one surfactant.

The invention also relates to a process for preparing the porous polymers which are in powder form and contain N-vinylimidazole units, wherein a) 5–100% by weight of at least one N-vinylimidazole of the formula

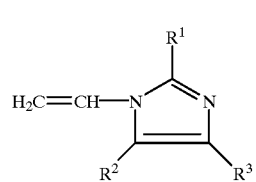

where $R^1$, $R^2$ and $R^3$ are identical or different and are H, $C_1$–$C_4$-alkyl, monomers of the formula

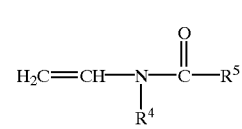

where $R^4$ and $R^5$ are identical or different and are H, $C_1$–$C_4$-alkyl, or together form a ring of 3 to 5 methylene groups, N-vinyloxazolidone, N-vinyltriazole, 4-vinylpyridine N-oxide or mixtures of said monomers, b) 0–95% by weight of other copolymerizable monoethylenically unsaturated monomers and c) 0–50% by weight of at least one monomer with at least two non-conjugated ethylenic double bonds are subjected to precipitation polymerization in the presence of free-radical initiators in aqueous solutions which contain 0.5–30% by weight of at least one electrolyte and, based on the monomers employed, 0.5–80% by weight of at least one surfactant.

The invention also relates to the use of the above-described porous polymers which are in powder form and contain N-vinylimidazole units as additive to phosphate-free and reduced-phosphate detergents to inhibit color transfer during the washing process.

DETAILED DESCRIPTION OF THE INVENTION

Examples of monomers of formula I are 1-vinylimidazole, 2-methyl-1-vinylimidazole, 2-ethyl-1-vinylimidazole, 2-propyl-1-vinylimidazole, 2-butyl-1-vinylimidazole, 2,4-dimethyl-1-vinylimidazole, 2,5-dimethyl-1-vinylimidazole, 2-ethyl-4-methyl-1-vinylimidazole, 2-ethyl-5-methyl-1-vinylimidazole, 2,4,5-trimethyl-1-vinylimidazole, 4,5-diethyl-2-methyl-1-vinylimidazole, 4-methyl-1-vinylimidazole, 5-methyl-1-vinylimidazole, 4-ethyl-1-vinylimidazole, 4,5-dimethyl-1-vinylimidazole or 2,4,5-triethyl-1-vinylimidazole. It is, of course, also possible to employ polymer mixtures of the abovementioned monomers in the polymerization.

Examples of monomers of formula II are open-chain N-vinylamides such as N-vinylformamide, N-vinylacetamide or N-methyl-N-vinylacetamide. Examples of cyclic N-vinylamides of the formula II are N-vinylpyrrolidone, N-vinylpiperidone and N-vinylcaprolactam. The compound of the formula II which is preferably employed is N-vinylpyrrolidone. Particularly preferred monomers of group a) are 1-vinylimidazole, 1-vinyl-2-methylimidazole or 1-vinylpyrrolidone, and mixtures of said monomers in any desired ratio. The monomers of group a) are employed in amounts of from 5 to 100, usually in amounts of from 50 to 100, and, particularly preferably, from 85 to 99.5% by weight, based on the total amount of monomers used in the polymerization.

Suitable group b) monomers are other monoethylenically unsaturated monomers which are copolymerizable with the group a) monomers. Examples of such monomers are (meth) acrylic esters such as methyl, ethyl, hydroxyethyl, propyl, hydroxypropyl, butyl, ethylhexyl, decyl, lauryl, i-bornyl, cetyl, palmityl, phenoxyethyl or stearyl acrylate or the corresponding methacrylates, (meth)acrylamides such as acrylamide, N-methylolacrylamide, N,N-dimethylaminopropylacrylamide, N,N-diethylaminopropylacrylamide, N-tert-butylacrylamide, N-tert-octylacrylamide, N-undecylacrylamide or the corresponding methacrylamides, vinyl esters with 2–30, in particular 2–14, carbon atoms in the molecule, such as vinyl acetate, vinyl propionate, vinyl laurate, vinyl neooctanoate, vinyl neononanoate, vinyl neodecanoate, styrene, vinyltoluene, α-methylstyrene, unsaturated carboxylic acids such as acrylic acid, methacrylic acid, crotonic acid, maleic acid, fumaric acid, itaconic acid or their corresponding anhydrides, 2-acrylamido-2-methylpropanesulfonic acid, acrylic esters which have a basic nitrogen atom, such as diethylaminoethyl acrylate, dimethylaminoethyl acrylate, dimethylaminopropyl acrylate or the corresponding methacrylic esters, 2-vinylpyridine or 4-vinylpyridine. Alkyl (meth)acrylates, vinyl acetate, styrene, acrylic acid, methacrylic acid, maleic acid and monomers having a basic nitrogen atom are particularly preferred.

If monomers (b) are employed, they are present in amounts of up to 95, preferably 2–50, % by weight, based on the total amount of all the monomers.

Suitable group (c) monomers are compounds having at least 2 non-conjugated ethylenic double bonds in the molecule. Compounds of this type are crosslinkers. Examples of suitable crosslinkers are acrylic esters, methacrylic esters, allyl ethers or vinyl ethers of at least dihydric alcohols. The OR groups of the underlying alcohols can in this connection be completely (in the case of dihydric alcohols) or partly (in the case of at least trihydric alcohols) etherified or esterified; however, the crosslinkers contain at least two ethylenically unsaturated groups. Examples of the underlying alcohols are dihydric alcohols such as 1,2-ethanediol, 1,2-propanediol, 1,3-propanediol, 1,2-butanediol, 1,3-butanediol, 2,3-butanediol, 1,4-butanediol, 2-butene-1,4-diol, 1,2-pentanediol, 1,5-pentanediol, 1,2-hexanediol, 1,6-hexanediol, 1,10-decanediol, 1,2-dodecanediol, 1,12-dodecanediol, neopentyl glycol, 3-methyl-1,5-pentanediol, 2,5-dimethyl-1,3-hexanediol, 2,2,4-trimethyl-1,3-pentanediol, 1,2-cyclohexanediol, 1,4-cyclohexanediol, 1,4-bis(hydroxymethyl)cyclohexane, hydroxypivalic acid neopentyl glycol monoester, 2,2-bis(4-hydroxyphenyl)propane, 2,2-bis[4-(2-hydroxypropyl)phenyl]propane, diethylene glycol, triethylene glycol, tetraethylene glycol, dipropylene glycol, tripropylene glycol, tetrapropylene glycol, 3-thia-1,5-pentanediol, and polyethylene glycols, polypropylene glycols and polytetrahydrofurans with molecular weights of, in each case, from 200 to 10,000. Apart from the homopolymers of ethylene oxide and propylene oxide, it is also possible to use block copolymers of ethylene oxide or propylene oxide or copolymers which contain incorporated ethylene oxide and propylene oxide groups. Examples of underlying alcohols with more than two OH groups are trimethyloipropane, glycerol, pentaerythritol, 1,2,5-pentanetriol, 1,2, 6-hexanetriol, triethoxycyanuric acid, sorbitan, sugars such as sucrose, glucose, mannose. It is, of course, also possible for the polyhydric alcohols to be employed after reaction with ethylene oxide or propylene oxide as the corresponding ethoxylates or propoxylates. The polyhydric alcohols can also be initially converted into the corresponding glycidyl ethers by reaction with epichlorohydrin.

Other suitable crosslinkers are the vinyl esters or the esters of monohydric unsaturated alcohols with ethylenically unsaturated $C_3$–$C_6$-carboxylic acids, for example acrylic acid, methacrylic acid, itaconic acid, maleic acid or fumaric acid. Examples of such alcohols are allyl alcohol, 1-buten-3-ol, 5-hexen-1-ol, 1-octen-3-ol, 9-decen-1-ol, dicyclopentenyl alcohol, 10-undecen-1-ol, cinnamyl alcohol, citronellol, crotyl alcohol or cis-9-octadecen-1-ol. However, it is also possible to esterify polybasic carboxylic acids with monohydric unsaturated alcohols, for example malonic acid, tartaric acid, trimnellitic acid, phthalic acid, terephthalic acid, citric acid or succinic acid.

Other suitable crosslinkers are esters of unsaturated carboxylic acids, for example of oleic acid, crotonic acid, cinnamic acid or 10-undecenoic acid, with the polyhydric alcohols described above.

Also suitable are straight-chain or branched, linear or cylic, aliphatic or aromatic hydrocarons which have at least two double bonds which, in the case of aliphatic hydrocarbons, must not be conjugated, eg. divinylbenzene, divinyltoluene, 1, 7-octadiene, 1,9-decadiene, 4-vinyl-1-cyclohexene, trivinylcyclohexane or polybutadienes with molecular weights of 200–20,000. Also suitable as crosslinkers are the acrylamides, methacrylamides and N-allyl derivatives of at least difunctional amines. Examples of such amines are diaminomethane, 1,2-diaminoethane, 1,3-diaminopropane, 1, 4-diaminobutane, 1,6- diaminohexane, 1,12-dodecanediamine, piperazine, diethylenetriamine or isophoronediamine. Also suitable are the amides from allylamine and unsaturated carboxylic acids such as acrylic acid, methacrylic acid, itaconic acid, maleic acid, or at least dibasic carboxylic acids as describe d above.

Also suitable are compounds, containing at least 2 N-vinyl groups, of urea derivatives, at leat difunctional amides, cyanurates or urethanes. Examples of urea derivatives are ethyleneurea and propyleneurea. A suitable difunctional amide is, for example, tartaramide. N,N'-Divinylethyleneurea is an example of a urea derivative containing at least 2 N-vinyl groups.

Other suitable crosslinkers are divinyldioxane, tetraallylsilane or tetravinylsilane. It is, of course, also possible to employ mixtures of the abovementioned compounds. The crosslinkers which are preferably employed are those which are soluble in the reaction mixture. Particularly preferred crosslinkers are methylenebisacrylamide, di- and triallylamine, divinylimidazole, N,N'-divinylethyleneurea, products of the reaction of polyhydric alcohols with acrylic acid or methacrylic acid, methacrylic esters and acrylic esters of polyalkylene oxides or of polyhydric alcohols which have been reacted with ethylene oxide and/or propylene oxide and/or epichlorohydrin, allyl methacrylate, and divinylbenzene. Methylenebisacrylamide, N,N'-divinylethyleneurea, acrylic and methacrylic esters of at least dihydric $C_2$–$C_4$-alcohols, allyl methacrylate and divinylbenzene are very particularly preferred. If crosslinkers are employed in the polymerization, they can be used in amounts of up to 50, 20 preferably from 0.2 to 30 and particularly preferably from 0.5 to 15, % by weight based on the total of the monomers employed in the polymerization.

The polymers according to the invention are prepared in the presence of surfactants. Suitable surfactants are described, for example, in M. and I. Ash, Handbook of Industrial Surfactants, Gower Publishing Co., Hants, 1993. Surfactants can be low molecular weight or polymeric compounds. They can be nonionic, cationic or anionic. Nonionic surfactants are particularly preferred.

Low molecular weight nonionic surfactants generally contain a straight-chain or branched, saturated or unsaturated, cyclic, acyclic or aromatic radical with 8–40, preferably 10–30, very particularly preferably 12–22, carbon atoms in the molecule. The alkyl radical can also be completely or partially fluorinated. The alkyl radical is bonded to a hydrophilic part of the molecule which contains at least one oxygen or nitrogen atom. Examples of preferred compounds are ethers and esters of sugars or sugar derivatives, such as sucrose esters, mannose esters, xylose esters or sorbitan esters, esters and ethers of glycerol, diglycerol, polyglycerol or glycerol/sugar condensates, ceramides and glycosyl-ceramides, fatty acid alkanolamides such as fatty acid ethanolamides, fatty acid isopropanolamides, fatty acid diethanolamides, fatty acid polydiethanolamides, N-alkylglucamides, N-Alkylpyrrolidone derivatives, alkyl pyrrolidone-5-carboxylates, citric and tartaric esters, $C_1$–$C_8$-alkyl (poly) glycosides, hydroxyalkyl polyglycosides, fatty acid esters of polyhydroxy compounds such as trimethylolpropane, erythritol, pentaerythritol, neopentyl diglycol, triethanolamine or condensates derived therefrom, alkoxylates, especially the adducts of ethylene oxide and/or propylene oxide with the abovementioned compounds and with oxo alcohols, $C_8$–$C_{30}$-alcohols, alkylphenols, fatty amides, fatty amines, fatty acids and derivatives such as hydroxy carboxylic acids, it being possible for the polyalkylene oxide chains to be modified at one end or both ends. In the case of modification at both ends, the modifying portions can be identical or different and, for example, also in part be a $C_1$–$C_4$-ether functionality.

Further surface-active compounds are sorbitan esters, sucrose esters or glycerol esters of $C_8$–$C_{30}$-carboxylic acids or the products of alkoxylation of these esters. The abovementioned esters are preferably derived from $C_{12}$–$C_{22}$-carboxylic acids. The alkoxylation products are to be understood to be preferably the adducts of ethylene oxide with the esters. Up to 80 mol of ethylene oxide can be added per mol of the suitable esters. Also suitable as surface-active compounds are the adducts of ethylene oxide and propylene oxide and/or butylene oxides with the esters. Alkyldimethylamine oxides are likewise suitable.

Polymeric surfactants which contain ethylene oxide and/ or propylene oxide units as hydrophilic part of the molecule are uncrosslinked and have molecular weights of from 500 to 100,000, preferably 700 to 20,000. The polymeric surfactants can, besides at least one hydrophilic block, contain at least one hydrophobic block or they are composed of a hydrophilic chain with hydrophobic branches arranged in the manner of a comb. The hydrophilic part of the polymeric surfactants is formed by homopolymers of ethylene oxide or propylene oxide or of block copolymers of ethylene oxide and propylene oxide and of block and comb polymers with blocks of polyethylene oxide, polypropylene oxide or polyco(ethylene oxide, propylene oxide), while the hydrophobic part of the polymeric surfactant consists of blocks of polystyrenes, polyalkyl (meth)acrylates, silicon oils, polyhydroxy fatty acids, polyamidoamines, polyisobutylene or polytetrahydrofurans. It is also possible in general to react polymers which have at least one amino group, one hydroxyl group which can be deprotonated with bases, or one ionic group and have a molecular weight of from 100 to 5000, with ethylene oxide, propylene oxide or mixtures thereof to give suitable polymeric surfactants.

Those of the abovementioned surfactants which are particularly preferred are adducts of ethylene oxide and/or propylene oxide with $C_{10}$–$C_{30}$-alcohols, $C_1$–$C_{18}$-alkylphenols, fatty amines containing at least 12 carbon atoms or fatty acids containing at least 10 carbon atoms, N-alkylglucamides, sucrose esters, sorbitan esters, (poly) glycerol esters or their corresponding ethoxylates, and alkyl (poly)glycosides. Adducts of ethylene oxide and/or propylene oxide with $C_{12}$–$C_{22}$-alcohols or alkylphenols, sorbitan esters, glycerol esters or their corresponding ethoxylates with 12 to 22 carbon atoms in the alkyl chain, and alkyl (poly)glycosides with 8 to 22 carbon atoms in the alkyl chain, are very particularly preferred. The surfactants have, for example, a softening point below 100° C., preferably below 60° C and particularly preferably below 40 ° C.

Based on the monomers employed in the polymerization, 0.5–80, preferably 1–60, % by weight of at least one surfactant are used.

The monomers are polymerized in aqueous solutions which contain water-soluble electrolytes in dissolved form. The electrolyte content of the aqueous solution is 0.5–30, preferably 1–25, usually in the range from 2 to 20, % by weight (these figures are based on the water employed).

Examples of suitable electrolytes are alkali metal, alkaline earth metal, ammonium or aluminum salts or mixtures of such salts. Examples thereof are ammonium sulfate, sodium sulfate, potassium sulfate, lithium sulfate, ammonium acetate, sodium acetate, potassium acetate, ammonium chloride, sodium chloride, potassium chloride, sodium bromide, sodium carbonate, sodium bicarbonate, ammonium carbonate, ammonium bicarbonate, potassium carbonate, potassium bicarbonate, calcium chloride, magnesium chloride, aluminum chloride, calcium nitrate, magnesium sulfate, aluminum sulfate and water-soluble phosphates, hydrogen phosphates, dihydrogen phosphates, borates, perborates and sulfites. Salts of organic amines, for example diethylammonium sulfate or ethanolammonium sulfate, are also suitable as electrolytes. Particularly preferred electrolytes are those which are normally an ingredient of detergent formulations, for example sodium sulfate, sodium carbonate and sodium citrate.

It is, of course, also possible to employ electrolyte mixtures, such as mixtures of sodium sulfate and sodium carbonate, or sodium sulfate and sodium citrate.

The monomers (a), (b) and (c) are at least partly soluble in water or dissolve therein in the presence of the other reactants.

The polymers produced in the polymerization are, by contrast, insoluble in the reaction medium and precipitate. The polymerization therefore takes place as a precipitation polymerization. The polymer which is insoluble in water or has only limited solubility therein precipitates out of the reaction mixture during the polymerization. The solids content of the polymerization mixture, ie. the content of surfactant, polymer and electrolyte, is chosen so that the suspension resulting from the polymerization remains stirrable throughout the reaction time. The total solids content is, for example, in the range from 1 to 80, preferably 10 to 60, and in most cases 15 to 40, % by weight.

The abovementioned monomers are normally polymerized using free-radical initiators, as a rule under an inert gas atmosphere. Free-radical initiators which can be used are hydrogen peroxide or inorganic persulfates, likewise organic compounds of the peroxide, peroxy ester, percarbonate or azo type, such as dibenzoyl peroxide, di-t-butyl peroxide, t-butyl hydroperoxide, dilauroyl peroxide, t-butyl perpivalate, t-amyl perpivalate, t-butyl perneodecanoate, 2,2'-azobis(2-amidinopropane) dihydrochloride, 4,4'-azobis (4-cyanovaleric acid), 2,2'-azobis[2-(2-imidazolin-2-yl) propane] dihydrochloride, 2,2'-azobis(2,4-dimethylvaleronitrile), 2,2'-azobisisobutyronitrile, 2,2'-azobis(2-methylbutyronitrile) and dimethyl 2,2'-azobis (isobutyrate). It is, of course, also possible to use mixtures of initiators or the known redox initiators. The initiators are used in the customary amounts, eg. in amounts of from 0.02 to 5% by weight, based on the monomers to be polymerized.

The polymerization is normally carried out under an inert gas atmosphere. The polymerization can be carried out, for example, in such a way that all the components present during the polymerization are introduced into a polymerization vessel, the reaction is started and the reaction mixture is cooled if necessary to control the polymerization temperature. However, the procedure can also be such that only one or only part of the components is initially introduced, the polymerization is started and the remainder of the components are metered in continuously or batchwise, singly or together, at various intervals depending on the progress of the polymerization. However, the procedure can also be such that initially only the diluent is introduced and then the monomers and the polymerization initiator are introduced into this separately, batchwise or continuously.

The monomers are generally polymerized at from 40 to 200, preferably 50 to 120° C. The temperature during the reaction can be controlled in various ways by a program. The polymerization is preferably carried out under atmospheric pressure but can also take place under reduced or elevated pressure. If the polymerization temperature is above the boiling point of the reaction mixture, the polymerization is carried out in pressure-tight apparatus under pressures of up to, for example, 16 bar.

It is known that deposits, which are often difficult to remove, are formed on the walls of the reaction vessels and on the stirrers during the preparation of crosslinked copolymers. There is virtually none of the otherwise interfering deposit formation during the preparation of the copolymers according to the invention.

The preparation of polymers which (formally) contain 4-vinylpyridine N-oxide units preferably takes place by polymerization or copolymerization of 4-vinylpyridine and subsequent N-oxidation of the pyridine ring with, for example, peracetic acid prepared in situ, cf. WO-A-94/20549.

The polymers which have basic N-containing groups can, following the reaction, be converted by a suitable reagent into a quaternized form. Suitable for the quaternization are, for example, alkyl halides with 1–18 carbon atoms in the molecule, eg. methyl chloride, ethyl chloride, propyl chloride, hexyl chloride, dodecyl chloride or lauryl chloride, and benzyl halides such as benzyl chloride. The corresponding iodine or bromine compounds are, of course, also suitable. Further suitable quaternizing agents are dialkyl sulfates, especially dimethyl sulfate and diethyl sulfate. In some cases it is also sufficient to convert the polymers into the salt formed by treatment with an acid. The quaternization can take place completely or partially.

The reaction mixture can, following the polymerization process, be subjected to a subsequent physical or chemical treatment. Examples of such processes are the known processes for reducing the residual monomer content, such as subsequent treatment by adding polymerization initiators or mixtures of several polymerization initiators at suitable temperatures or heating the polymerization solution to temperatures above the polymerization temperature, subsequent treatment of the polymer solution using steam or stripping with nitrogen, or treatment of the reaction mixture with oxidizing or reducing reagents.

The polymers can be isolated from the reaction mixture for example by filtration or centrifugation. The particulate porous polymers are washed with water and subsequently dried. If required, the polymer can be homogenized by wet milling of a polymer suspension either before or after working up. The particle size is rendered homogeneous also by dry milling of the polymer. The apparent density of the dry powder can be increased by compacting the loosely packed powder. The average diameter of the polymer particles is, for example, 1–1000 $\mu$m and is preferably in the range from 1 to 800 $\mu$m. Particle sizes of from 1 to 500 $\mu$m are particularly preferred.

In contrast to the prior art fine-particle polymers of the same composition, the polymers which are in powder form and contain N-vinylimidazole units according to the invention have a porous surface. This can be clearly seen, for example, on electron micrographs. The porous polymers which are in powder form and contain N-vinylimidazole units are more effective color-transfer inhibitors than fine-particle polymers with the same composition and a smooth surface.

The porous polymers which are in powder form and contain N-vinylimidazole units are used as additive to phosphate-free and reduced phosphate detergents to inhibit color transfer during the washing process. The effect of these polymers when colored and white textiles are washed together is to inhibit color transfer to textiles which are not colored or have a different color.

The detergents can be in powder form or else in liquid formulation. The composition of the detergents and cleaners may vary widely. Detergent and cleaner formulations normally contain 2–50% by weight of surfactants and, where appropriate, builders. These data apply both to liquid and to powder detergents. Detergent and cleaner formulations customary in Europe, the USA and Japan are tabulated, for example, in Chemical and Engn. News, 67 (1989) 35. Further details of the composition of detergents and cleaners are to be found in Ullmanns Enzyklopadie der technischen Chemie, Verlag Chemie, Weinheim 1983, 4th edition, pages 63 to 160.

Reduced phosphate detergents are formulations which contain not more than 25% by weight of phosphate calculated as pentasodium triphosphate. The copolymers to be used according to the invention as color-transfer inhibitors are employed in the detergents for example in amounts of from 0.05 to 5, preferably 0.2 to 2.5, and particularly preferably in amounts of from 0.25 to 1.5% by weight. The polymers to be used according to the invention are moreover used in detergents in powder or granule form or else in liquid detergents. The detergents may be heavy duty detergents or specialty detergents. Suitable surfactants are both anionic and nonionic, or mixtures of anionic and nonionic surfactants. The surfactant content of the detergents is, preferably, 8–30% by weight.

Examples of suitable anionic surfactants are fatty alcohol sulfates of fatty alcohols with 8–22, preferably 10–18, carbon atoms, eg. $C_9$–$C_{11}$-alcohol sulfates, $C_{12}$–$C_{13}$-alcohol sulfates, cetyl sulfate, myristyl sulfate, palmityl sulfate, stearyl sulfate and tallow fatty alcohol sulfate.

Other suitable anionic surfactants are sulfated, ethoxylated $C_8$–$C_{22}$-alcohols and soluble salts thereof. Compounds of this type are prepared, for example, by initially alkoxylating a $C_8$–$C_{22}$-, preferably $C_{10}$–$C_{18}$-alcohol, and subsequently sulfating the alkoxylation product. Ethylene oxide is preferably used for the alkoxylation, in which case 2–50, preferably 3–20, mol of ethylene oxide are employed per mol of fatty alcohol. The alkoxylation of the alcohols can, however, also be carried out with propylene oxide alone and, where appropriate, butylene oxide. Also suitable are alkoxylated $C_8$–$C_{22}$-alcohols containing ethylene oxide and propylene oxide or ethylene oxide and butylene oxide. The alkoxylated $C_8$–$C_{22}$-alcohols can contain the ethylene oxide, propylene oxide and butylene oxide units in the form of blocks or in random distribution.

Other suitable anionic surfactans are alkylsulfonates such as $C_8$–$C_{24}$, preferably $C_{10}$–$C_{18}$-alkanesulfonates and soaps such as the salts of $C_8$–$C_{24}$-carboxylic acids.

Other suitable anionic surfactants are linear $C_9$–$C_{20}$-alkylbenzenesulfonates (LAS). The polymers according to the invention are preferably employed in detergent formulations containing less than 4% LAS, particularly preferably in LAS-free formulations.

The anionic surfactants are added to the detergents preferably in the form of salts. Suitable cations in these salts are alkali metal ions such as sodium, potassium, lithium and ammonium ions, eg. hydroxyethylammonium, di(hydroxyethyl)ammonium and tri(hydroxyethyl) ammonium ions.

Examples of suitable nonionic surfactants are alkoxylated $C_8$–$C_{22}$-alcohols. The alkoxylation can be carried out with ethylene oxide, propylene oxide and/or butylene oxide. It is possible to employ as surfactant in this case all alkoxylated alcohols which contain at least two molecules of one of the abovementioned alkylene oxides in the adduct. Once again, block polymers of ethylene oxide, propylene oxide and/or butylene oxide, or adducts which contain said alkylene oxides in random distribution, are suitable. 2–5, preferably 3–20, mol of at least one alkylene oxide are used per mol of alcohol. Ethylene oxide is preferably employed as alkylene oxide. The alcohols preferably have 10–18 carbon atoms.

Another class of nonionic surfactants comprises alkyl polyglucosides with 8–22, preferably 10–18, carbon atoms in the alkyl chain. These compounds contain 1–20, preferably 1.1–5, glucoside units.

Another class of nonionic surfactants comprises N-alkylglucamides of the general structure III or IV

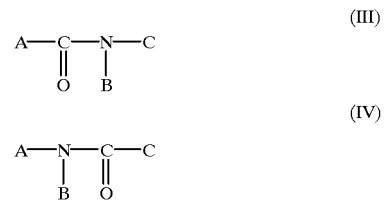

where A is $C_6$–$C_{22}$-alkyl, B is H or $C_1$–$C_4$-alkyl and C is a polyhydroxyalkyl radical with 5–12 carbon atoms and at least 3 30 hydroxyl groups. A is preferably $C_{10}$–$C_{18}$-alkyl, B is $CH_3$ and C is a $C_5$ or $C_6$ radical. Compounds of this type are obtained, for example, by acylating reductively aminated sugars with $C_{10}$–$C_{18}$-carbonyl chlorides. The detergent formulations preferably contain $C_{10}$–$C_{16}$-alcohols ethoxylated with 3–12 mol of ethylene oxide, particularly preferably ethoxylated fatty alcohols, as nonionic surfactants.

The detergents in powder or granule form and, where appropriate, also structured liquid detergents additionally contain one or more inorganic builders. Suitable inorganic builders are all conventional inorganic builders such as alumosilicates, silicates, carbonates and phosphates.

Examples of suitable inorganic builders are alumosilicates with ion-exchanging properties, such as zeolites. Various types of zeolites are suitable, especially zeolites A, X, B, P, MAP and HS in their Na form or in forms in which Na is partly replaced by other cations such as Li, K, Ca, Mg or ammonium. Suitable zeolites are described, for example, in EP-A-0 038 591, EP-A-0 021 491, EP-A-0 087 035, U.S. Pat. No. 4,604,224, GB-A-2 013 259, EP-A-0 522 726, EP-A-0 384 070A and WO-A-94/24251.

Examples of other suitable inorganic builders are amorphous or crystalline silicates such as amorphous disilicates, crystalline disilicates such as the sheet silicate SKS-6 (manufactured by Hoechst). The silicates can be employed in the form of their alkali metal, alkaline earth metal or ammonium salts. Na, Li and Mg silicates are preferably employed.

Further suitable inorganic builders are carbonates and bicarbonates. These can be employed in the form of their alkali metal, alkaline earth metal or ammonium salts. Preferably employed are Na, Li and Mg carbonates and bicarbonates, especially sodium carbonate and/or sodium bicarbonate.

The inorganic builders may be present in the detergents in amounts of from 0 to 60% by weight, together with organic cobuilders to be used where appropriate. The inorganic builders can be incorporated either alone or in any desired combination with one another into the detergent. In detergents in powder or granule form, they are added in amounts of from 10 to 60% by weight, preferably in amounts of from 20 to 50% by weight. In structured (multiphase) liquid detergents, inorganic builders are added in amounts of up to 40% by weight, preferably up to 20% by weight. They are suspended in the liquid ingredients of the formulation.

The detergents preferably contain in addition one or more organic cobuilders. These comprise low molecular weight or polymeric polycarboxylates and/or amino polycarboxylates. Examples of suitable low molecular weight polycarboxylates are $C_4$–$C_{20}$-di-, tri- and tetracarboxylic acids such as succinic acid, propanetricarboxylic acid, butanetetracarboxylic acid, cyclopentanetetracarboxylic acid and alkyl- and alkenylsuccinic acids with $C_2$–$C_{16}$-alkyl or alkenyl radicals, $C_4$–$C_{20}$-hydroxy carboxylic acids such as malic acid, tartaric acid, gluconic acid, glucaric acid, citric acid, lactobionic acid and sucrosemono-, -di- and -tricarboxylic acid and amino polycarboxylates such as nitrilotriacetic acid, methylglycinediacetic acid, alaninediacetic acid, ethylenediaminetetraacetic acid and serinediacetic acid.

Examples of suitable polymeric polycarboxylates are (1) oligomaleic acids, cf., for example, EP-A-0 451 508, EP-A-0 396 303, (2) copolymers of unsaturated $C_4$–$C_8$-dicarboxylic acids, suitable comonomers being i) monoethylenically unsaturated $C_3$–$C_8$-monocarboxylic acids such as acrylic acid, methacrylic acid, crotonic acid and vinylacetic acid, preferably acrylic acid and methacrylic acid, ii) $C_2$–$C_{22}$-monoolefines, vinyl alkyl ethers with $C_1$–$C_8$-alkyl groups, styrene, vinyl esters of $C_1$–$C_8$-carboxylic acids, (meth)acrylamide and vinylpyrrolidone, preferably $C_2$–$C_6$-α-olefines, vinyl alkyl ethers with $C_1$–$C_4$-alkyl groups, vinyl acetate and vinyl propionate, iii) (meth)acrylic esters of $C_1$–$C_8$-alcohols, (meth)acrylonitrile, (meth)acrylamides of $C_1$–$C_8$-amines, N-vinylformamide and N-vinylimidazole.

Examples of suitable unsaturated $C_4$–$C_8$-dicarboxylic acids are maleic acid, fumaric acid, itaconic acid and citraconic acid. Maleic acid is preferred. The copolymers may contain the monomers of group i) in amounts of up to 95%, ii) in amounts of up to 60% and iii) in amounts of up to 20%.

The copolymers may contain units of 2, 3, 4 or, where appropriate, even 5 different monomers.

If the polymers of group ii) contain vinyl ester units, these can also be partially or completely hydrolyzed to vinyl alcohol units. Suitable co- and terpolymers are disclosed, for example, in U.S. Pat. No. 3,887,806 and DE-A-4 313 909.

Suitable and preferred copolymers of dicarboxylic acids are copolymers of maleic acid and acrylic acid in the ratio 10:90 to 95:5 by weight, particularly preferably those in the ratio 30:70 to 90:10 by weight and with molecular weights of from 40,000 to 150,000, terpolymers of maleic acid, acrylic acid and a vinyl ester of a $C_1$–$C_3$-carboxylic acid in the ratio 10 (malic acid):90 (acrylic acid+vinyl ester) to 95 (maleic acid):10 (acrylic acid +vinyl ester) by weight, where the ratio of acrylic acid to vinyl ester can vary in the range from 20:80 to 80:20 by weight and, particularly preferably, terpolymers of maleic acid, acrylic acid and vinyl acetate or vinyl propionate in the ratio 20 (maleic acid):80 (acrylic acid +vinyl ester) to 90 (maleic acid):10 (acrylic acid +vinyl ester) by weight, where the ratio of acrylic acid to vinyl ester can vary in the range from 30:70 to 70:30 by weight, and copolymers of maleic acid with $C_2$–$C_6$-α-olefines in the molar ratio 40:60 to 80:20, with copolymers of maleic acid and ethylene, propylene or isobutene in the molar ratio 50:50 being particularly preferred.

3) Graft copolymers of unsaturated carboxylic acids on low molecular weight carbohydrates or hydrogenated carbohydrates, cf. U.S. Pat. No. 5,227,446, DE-A-4 415 623, and DE-A-4 313 909.

Examples of suitable unsaturated carboxylic acids are maleic acid, fumaric acid, itaconic acid, citraconic acid, acrylic acid, methacrylic acid, crotonic acid and vinylacetic acid, and mixtures of acrylic acid and maleic acid, which are grafted on in amounts of from 40 to 95% by weight, based on the component to be grafted. It is additionally possible for up to 30% by weight, based on the component to be grafted, of other monoethylenically unsaturated monomers to be present in the copolymer for modification. Suitable modifying monomers are the abovementioned monomers of groups ii) and iii).

Suitable as grafting base are degraded polysaccharides such as acidically or enzymatically degraded starches, inulins or cellulose, reduced (hydrogenated or reductively aminated) degraded polysaccharides such as mannitol, sorbitol, aminosorbitol and glucamine, and polyalkylene glycols with molecular weights of up to Mw=5000, such as polyethylene glycols, ethylene oxide/propylene oxide or ethylene oxide/butylene oxide block copolymers, random ethylene oxide/propylene oxide or ethylene oxide/butylene oxide copolymers, alkoxylated monohydric or polyhydric $C_1$–$C_{22}$-alcohols, cf. U.S. Pat. No. 4,746,456.

Preferably employed from this group are grafted degraded or degraded reduced starches and grafted polyethylene oxides, employing 20–80% by weight of monomers based on the grafting components in the graft polymerization. Preferably employed for the grafting is a mixture of maleic acid and acrylic acid in the range from 90:10 to 10:90.

(4) Polyglyoxylic acid, cf., for example, EP-B-0 001 004, U.S. Pat. No. 5,399,286, DE-A-4 106 355 and EP-A-0 656 914. The end groups of the polyglyoxylic acids may vary in structure.

(5) Polyamido carboxylic acids and modified polyamido carboxylic acids, cf., for example, EP-A-0 454 126, EP-B-0 511 037, WO-A-94/01486 and EP-A-0 581 452.

Polyaspartic acid or cocondensates of aspartic acid with other amino acids, $C_4$–$C_{25}$-mono- or dicarboxylic acids, $C_4$–$C_{25}$-mono- or diamines are preferably used. Polyaspartic acids prepared in phosphorus-containing acids and modified with $C_6$–$C_{22}$-mono- or dicarboxylic acids or with $C_6$–$C_{22}$-mono- or diamines are particularly preferably employed.

(6) Condensates of citric acid with hydroxy carboxylic acids or polyhydroxy compounds, cf., for example, WO-A-93/22362 and WO-A-92/16493. Carboxyl-containing condensates of this type have molecular weights of up to 10,000, preferably of up to 5000.

Detergent formulations which are in powder or granule form or structured liquids contain organic cobuilders in amounts of from 0 to 15% by weight, preferably in amounts of from 1 to 8% by weight, together with inorganic builders. Liquid detergent formulations contain organic cobuilders in amounts of from 0 to 20% by weight, preferably in amounts of from 1 to 10% by weight, particularly preferably in amounts of from 1.5 to 7.5% by weight. Heavy duty detergents in powder or granule form additionally contain a bleaching system consisting of at least one bleach, where appropriate combined with a bleach activator and/or a bleach catalyst.

Suitable bleaches are perborates and percarbonates in the form of their alkali metal, in particular their Na salts. They are present in the formulations in amounts of from 5 to 30% by weight, preferably 10 to 25% by weight. Further suitable bleaches are inorganic and organic peracids in the form of their alkali metal or magnesium salts or partly also in the form of the free acids. Examples of suitable organic percarboxylic acids or salts thereof are Mg monoperphthalate, phthalimidopercaproic acid and 1,10-diperdodecanedioic acid. An example of an inorganic peracid salt is potassium peroxomonosulfate (Oxone).

Examples of suitable bleach activators are acylamines such as tetraacetylethylenediamine, tetraacetylglycoluril, N,N'-diacetyl-N,N'-dimethylurea and 1,5-diacetyl-2,4-dioxohexahydro-1,3,5-triazine acylated lactams such as acetylcaprolactam, octanoylcaprolactam and benzoylcaprolactam substituted phenol esters of carboxylic acids, such as Na acetoxybenzenesulfonate, Na octanoyloxybenzenesulfonate and Na nonanoyloxybenzenesulfonate acylated sugars such as pentaacetylglucose anthranil derivatives such as 2-methylanthranil or 2-phenylanthranil enol esters such as isopropenyl acetate oxime esters such as acetone O-acetyloxime carboxylic anhydrides such as phthalic anhydride or acetic anhydride.

Tetraacetylethylenediamine and Na nonanoyloxybenzenesulfonate are preferably employed as bleach activators. The bleach activators are added to heavy duty detergents in amounts of from 0.1 to 15% by weight, preferably in amounts of from 1.0 to 8.0% by weight, particularly preferably in amounts of from 1.5 to 6.0% by weight.

Suitable bleach catalysts are quaternized imines and sulfone imines as described in U.S. Pat. No. 5,360,568, U.S. Pat. No. 5,360,569 and EP-A-0 453 003, and Mn complexes, cf., for example, WO-A-94/21777. If bleach catalysts are employed in the detergent formulations, they are present therein in amounts of up to 1.5% by weight, preferably up to 0.5% by weight, and in the case of the very active manganese complexes in amounts of up to 0.1% by weight.

The detergents preferably contain an enzyme system. This comprises the proteases, lipases, amylases and cellulases normally employed in detergents. The enzyme system can be confined to a single enzyme or contain a combination of various enzymes. The amounts of the commercial enzymes normally added to the detergents are from 0.1 to 1.5% by weight, preferably 0.2 to 1.0% by weight, of the formulated enzyme. Examples of suitable proteases are Savinase and Esperase (manufactured by Novo Nordisk). A suitable lipase is, for example, Lipolase (manufactured by Novo Nordisk). A suitable cellulase is, for example, Celluzym (manufactured by Novo Nordisk).

The detergents preferably contain soil-release polymers and/or antiredeposition agents. These comprise, for example, polyesters from polyethylene oxides with ethylene glycol and/or propylene glycol and aromatic dicarboxylic acids or aromatic and aliphatic dicarboxylic acids. Polyesters from polyethylene oxides which are endgroup-capped at one end with dihydric and/or polyhydric alcohols and dicarboxylic acids. Polyesters of these types are known, cf., for example, U.S. Pat. No. 3,557,039, GB-A-1 154 730, EP-A-0 185 427, EP-A-0 241 984, EP-A-0 241 985, EP-A-0 272 033 and U.S. Pat. No. 5,142,020.

Further suitable soil-release polymers are amphiphilic graft copolymers of vinyl ester and/or acrylic ester on polyalkylene oxides, cf. U.S. Pat. No. 4,746,456, U.S. Pat. No. 4,846,995, DE-A-3 711 299, U.S. Pat. No. 4,904,408, U.S. Pat. No. 4,846,994 and U.S. Pat. No. 4,849,126 or modified celluloses such as methylcellulose, hydroxypropylcellulose or carboxymethylcellulose.

The detergent formulations contain 0–2.5% by weight, preferably 0.2–1.5% by weight, particularly preferably 0.3–1.2% by weight, of antiredeposition agents and soil-release polymers. Soil-release polymers which are preferably employed are the graft copolymers, disclosed in U.S. Pat. No. 4,746,456, of vinyl acetate onto polyethylene oxide of molecular weight 2500–8000 in the ratio 1.2:1 to 3.0:1 by weight, and commercial polyethylene terephthalate/polyoxyethylene terephthalates of molecular weight 3000–25,000 from polyethylene oxides of molecular weight 750–5000 with terephthalic acid and ethylene oxide and with a molar ratio of polyethylene terephthalate to polyoxyethylene terephthalate of from 8:1 to 1:1, and the block polycondensates which are disclosed in DE-A-4 403 866 and contain blocks of (a) ester units of polyalkylene glycols of a molecular weight of from 500 to 7500 and aliphatic dicarboxylic acids and/or monohydroxy monocarboxylic acids and (b) ester units from aromatic dicarboxylic acids and polyhydric alcohols. These amphiphilic block copolymers have molecular weights of from 1500 to 25,000.

A typical heavy duty detergent in powder or granule form can have the following composition, for example:

3–50, preferably 8–30, % by weight of at least one anionic and/or nonionic surfactant, 5–50, preferably 15–42.5, % by weight of at least one inorganic builder, 5–30, preferably 10–25, % by weight of an inorganic bleach, 0.1–15, preferably 1–8, % by weight of a bleach activator, 0–1, preferably up to a maximum of 0.5, % by weight of a bleach catalyst, 0.05–5% by weight, preferably 0.2–2.5% by weight, of a polymer according to the invention as color-transfer inhibitor, 1.5–20, preferably 2.5–8, % by weight of at least one organic cobuilder, 0.2–1.0% by weight of protease, 0.2–1.0% by weight of lipase, 0.3–1.5% by weight of a soil-release polymer.

Color-sparing specialty detergents (for example color detergents) often dispense completely or partly with a bleaching system. A typical color detergent in powder or granule form can have, for example, the following composition:

3–50, preferably 8–30, % by weight of at least one anionic and/or nonionic surfactant, 10–60, preferably 20–55, % by weight of at least one inorganic builder, 0–15, preferably 0–5, % by weight of an inorganic bleach, 0.05–5% by weight, preferably 0.2–2.5% by weight, of a polymer according to the invention as color-transfer inhibitor, 0–20, preferably 1–8, % by weight of at least one organic cobuilder, 0.2–1.0% by weight of protease, 0.2–1.0% by weight of cellulase, 0.2–1.5 % by weight of a soil-release polymer, eg. a graft copolymer of vinyl acetate onto polyethylene glycol.

The detergents in powder or granule form can contain up to 60% by weight of inorganic fillers. Sodium sulfate is normally used for this purpose. However, the detergents according to the invention preferably have a low filler content of up to 20% by weight, particularly preferably up to 8% by weight.

The detergents according to the invention may have various apparent densities in the range from 300 to 950 g/l. Modern compact detergents usually have high apparent densities and a granular structure.

The liquid detergents according to the invention contain, for example,

- 5–60, preferably 10–40, % by weight of at least one anionic and/or nonionic surfactant,
- 0.05–5% by weight, preferably 0.2–2.5 % by weight of a porous polymer according to the invention, which is in powder form, as color-transfer inhibitor,
- 0–20, preferably 1–8, % by weight of at least one polycarboxylate and/or citric acid,
- 0–1.0% by weight of protease,
- 0–1.0% by weight of cellulase,
- 0–1.5% by weight of a soil-release polymer and/or antiredeposition agent,
- 0–60% by weight of water,
- 0–10% by weight of alcohols, glycols such as ethylene glycol, diethylene glycol or propylene glycol, or glycerol.

The detergents can contain, where appropriate, other conventional additives. Other additives which can be present where appropriate are, for example, fillers, complexing agents, phosphonates, optical brighteners, dyes, perfume oils, foam suppressants and corrosion inhibitors.

The percentages in the examples are % by weight unless otherwise indicated.

EXAMPLES

Example 1

480 g of water, 53 g of sodium sulfate, 8 g of a $C_{13}$–$C_{15}$ oxo alcohol which had been reacted with 7 units of ethylene oxide per molecule, 40 g of N-vinylimidazole, 40 g of N-vinylpyrrolidone, 10 g of N,N'-divinylethyleneurea and 0.8 g of 2,2'-azobis(2-amidinopropane) dihydrochloride were heated with stirring in a flask which had a capacity of 2 l and was equipped with a stirrer, reflux condenser, thermometer and an apparatus for operating under protective gas, to 80° C. The mixture was stirred at this temperature for 1 hour. A fine-particle product is obtained after 1.5 hours. After stirring at high speed for five hours, the mixture is allowed to cool, and the polymer is filtered off and then washed twice with 2 l of water each time. Drying in a vacuum drying oven at 95° C. results in 77.1 g of a yellowish microporous powder with an average particle size of 450 μm.

Example 2

480 g of water, 53 g of sodium sulfate, 16 g of a nonylphenol which had been reacted with 8 units of ethylene oxide per molecule, 40 g of N-vinylimidazole, 40 g of N-vinylpyrrolidone, 10 g of N,N'-divinylethyleneurea and 0.8 g of 2,21-azobis(2-amidinopropane) dihydrochloride were heated with stirring in a flask which had a capacity of 2 l and was equipped with a stirrer, reflux condenser, thermometer and an apparatus for operating under protective gas, to 80° C. The mixture was stirred at this temperature for 6 hours. Workup is as described in Example 1. Drying in a vacuum drying oven at 95° C. results in 82 g of a yellowish microporous powder with an average particle size of 200 μm.

Example 3

480 g of water, 53 g of sodium sulfate, 4 g of a nonylphenol which had been reacted with 8 units of ethylene oxide per molecule, 40 g of N-vinylimidazole, 40 g of N-vinylpyrrolidone, g of N,N'-divinylethyleneurea and 0.8 g of 2,2'-azobis(2-amidinopropane) dihydrochloride were heated with stirring in a flask which had a capacity of 2 l and was equipped with a stirrer, reflux condenser, thermometer and an apparatus for operating under protective gas, to 80° C. The mixture was stirred at this temperature for 6 hours workup is as described in Example 1. Drying in a vacuum drying oven at 95° C. results in 82.7 g of a beige-colored microporous powder with an average particle size of 300 μm.

Example 4

480 g of water, 5 g of sodium sulfate, 32 g of a nonylphenol which had been reacted with 10 units of ethylene oxide per molecule, 60 g of N-vinylimidazole, 20 g of N-vinylpyrrolidone, 4 g of N,N'-divinylethyleneurea and 0.8 g of 2,2'-azobis(2-amidinopropane) dihydrochloride were heated with stirring in a flask which had a capacity of 2 l and was equipped with a stirrer, reflux condenser, thermometer and an apparatus for operating under protective gas, to 80° C. The mixture was polymerized at this temperature for 5 hours. Filtration, washing twice with a total of 2 l of water and subsequent drying at 80 ° C. in a vacuum drying oven resulted in isolation of 71 g of a very fine-particle, beige-colored porous powder with an average particle size of 350 μm.

Example 5

500 g of water, 12 g of sodium carbonate, 45 g of a nonylphenol which had been reacted with 8 units of ethylene oxide per molecule, 60 g of N-vinylimidazole, 20 g of N-vinylpyrrolidone, 12 g of N,N'-divinylethyleneurea and 0.8 g of 2,2'-azobis(2-amidinopropane) dihydrochloride were heated with stirring in a flask which had a capacity of 2 l and was equipped with a stirrer, reflux condenser, thermometer and an apparatus for operating under protective gas, to 80° C. The mixture was polymerized at this temperature for 5 hours. Filtration, washing twice with a total of 2 l of water and subsequent drying at 80° C. in a vacuum drying oven resulted in isolation of 76 g of a beige-colored porous powder with an average particle size of 260 μm.

Example 6

490 g of water, 15 g of a $C_{13}$–$C_{15}$ oxo alcohol which had been reacted with 7 units of ethylene oxide per molecule, 47 g of sodium carbonate, 30 g of N-vinylimidazole, 90 g of N-vinylpyrrolidone, 10 g of N,N'-divinylethyleneurea and 0.8 g of 2,2'-azobis(2-amidinopropane) dihydrochloride were heated with stirring in a flask which had a capacity of 2 l and was equipped with stirrer, reflux condenser, thermometer and an apparatus for operating under protective gas, to 80° C. The mixture was polymerized at this temperature for 5 hours. Filtration, washing twice with a total of 2 l of water and subsequent drying at 80° C. in a vacuum drying oven resulted in isolation of 113 g of a very fine-particle white porous powder with an average particle size of 295 nm.

Example 7

530 g of water, 8 g of a $C_{13}$–$C_{15}$ oxo alcohol which had been reacted with 11 units of ethylene oxide per molecule, 15 g of sodium carbonate, 20 g of N-vinylimidazole, 85 g of N-vinylpyrrolidone, 12 g of N,N'-divinylethyleneurea and 0.8 g of 2,2'-azobis(2-amidinopropane) dihydrochloride were heated with stirring in a flask which had a capacity of 2 l and was equipped with stirrer, reflux condenser, thermometer and an apparatus for operating under protective gas, to 80° C. The mixture was polymerized at this temperature for 5 hours. Filtration, washing twice with a total of 2 l of water and subsequent drying at 80° C. in a vacuum drying oven resulted in isolation of 103 g of a white porous powder with an average particle size of 305 μm.

comparative Example 1

480 g of water, 40 g of N-vinylimidazole, 40 g of N-vinylpyrrolidone, 0.4 g of N,N'-divinylethyleneurea and 0.8 g of 2,2'-azobis(2-amidinopropane) dihydrochloride were heated with stirring in a flask which has a capacity of 2 l and was equipped with a stirrer, reflux condenser, thermometer and an apparatus for operating under protective gas, to 80° C. The mixture was polymerized at this temperature for 5 hours. Only a gel formed, and this was not worked up.

Comparative Example 2

Example 1 of U.S. Pat. No. 3,689,439 was reproduced by heating 480 g of water, 80 g of sodium sulfate, 0.92 g of $NaH_2PO_4$ solution (10% by weight), 40 g of N-vinylimidazole, 40 g of N-vinylpyrrolidone, 3.2 g of methylenebisacrylamide, 0.24 g of 2,2'-azobis(2-methylpropionitrile) with stirring in a flask which had a capacity of 2 l and was equipped with a stirrer, reflux condenser, thermometer and an apparatus for operating under protective gas, to 65° C. After stirring for 4 hours, a solution consisting of 0.08 g of 2,2'-azobis(2-methylpropionitrile), 0.8 g of methylenebisacrylamide, 20 g of ethanol and 20 g of water was added under nitrogen. The mixture was stirred at 65° C. for a further 2 hours. It was subsequently filtered, and the residue was washed with water. Drying in a vacuum drying oven resulted in 79.4 g of a beige-colored, large-particle powder which was subsequently comminuted in a laboratory mill.

Scanning electron micrographs of the polymer powder show a smooth surface in contrast to the copolymers obtained as in Examples 1–7.

In order to illustrate the use of porous crosslinked polymers which are in powder form and contain N-vinylimidazole units as color-transfer inhibitors in detergents, detergent compositions I to XII were prepared, using copolymers of Examples 1–3 and the copolymer of Comparative Example 2 as color-transfer inhibitor in all the formulations. In order to eliminate the effect of the different particle size distributions, the <63 μm screen fractions of the copolymers of Examples 1–3 and of Comparative Example 2 were used. Detergent formulations I to VI are color-sparing heavy duty detergents. The individual ingredients are indicated in Table 1.

The abbreviations used in Tables 1 and 2 have the following meanings:
TAED: Tetraacetylethylenediamine
NOBS: Nonanoyloxybenzenesulfonic acid Na salt
2-Phenylanthranil: 2-Phenylbenzo(4H)-1,3-oxazin-4-one
SKS-6: Sheet silicate Na salt (manufactured by Hoechst)
EO: Ethylene oxide
Copolymer 1: Acrylic acid/maleic acid copolymer in the ratio 70:30 by weight with molecular weight Mw=70,000
Copolymer 2: Acrylic acid/maleic acid copolymer in the ratio 40:60 by weight with molecular weight Mw=10,000
Copolymer 3: Acrylic acid/maleic acid/vinyl acetate terpolymer in the molar ratio 40:10:50 with molecular weight Mw=20,000
Soil-release polymer 1: Graft copolymer of vinyl acetate onto polyethylene glycol of molecular weight 6000, molecular weight of the graft copolymer 24,000
Soil-release polymer 2: Polyester with units of polyethylene terephthalate and polyoxyethylene terephthalate in the molar ratio 2:3, molecular weight of the condensed polyethylene glycol 4000

TABLE 1

Formulations I–VI of color-sparing heavy duty detergents

|  | I | II | III | IV | V | VI |
|---|---|---|---|---|---|---|
| Na lauryl sulfate |  | 6.0 | 7.5 | 5.0 | 5.5 |  |
| Linear Na alkylbenzenesulfonate | 3.1 | 1.7 |  |  |  |  |
| Soap | 2.8 | 0.6 | 3.0 | 1.0 | 1.5 |  |
| $C_{13}$–$C_{15}$ oxo alcohol *3 EO |  | 3.0 |  |  |  |  |
| $C_{13}$–$C_{15}$ oxo alcohol *7 EO | 4.7 |  | 6.0 | 1.5 | 4.0 | 6.5 |
| $C_{13}$–$C_{15}$ oxo alcohol *10 EO |  | 3.0 |  |  |  |  |
| Lauryl alcohol *13 EO |  |  |  | 2.0 |  | 5.0 |
| Zeolite A | 25 | 25 | 28 |  | 30 | 15 |
| Zeolite P |  |  |  | 38 |  |  |
| SKS-6 |  |  | 12 |  |  | 15 |
| Na disilicate | 2.5 | 3.9 |  | 0.5 | 4.5 |  |
| Mg silicate | 1.0 |  | 1.0 |  | 1.0 | 1.0 |
| Sodium sulfate | 20 | 2.5 | 1.5 | 1.0 | 1.5 | 5.5 |
| Sodium bicarbonate |  |  | 6.5 | 6.5 |  |  |
| Sodium carbonate | 12.0 | 13.6 |  |  | 10.0 | 8.0 |
| Soil-release polymer 1 |  | 0.4 | 1.0 |  | 0.5 |  |
| Soil-release polymer 2 | 1.0 |  |  |  | 0.5 | 0.8 |
| Na perborate monohydrate | 15 | 15 |  |  | 15 |  |
| Na percarbonate |  |  | 15 | 20 |  | 18 |
| TAED | 4.0 | 3.8 | 4.0 | 3.8 | 2.9 |  |

TABLE 1-continued

Formulations I–VI of color-sparing heavy duty detergents

|  | I | II | III | IV | V | VI |
|---|---|---|---|---|---|---|
| 2-Phenylanthranil |  |  |  |  |  | 3.5 |
| NOBS |  |  |  |  | 4.0 |  |
| Polymer obtained as in Example 1 | 1.0 | 0.5 | 1.0 | 1.0 | 0.5 | 0.5 |
| Copolymer 1 |  | 5.0 |  |  |  |  |
| Copolymer 2 | 6.0 |  |  |  |  | 8.5 |
| Copolymer 3 |  |  | 3.5 |  |  |  |
| Polyacrylic acid $M_w$ 8000 |  |  |  | 4.5 |  |  |
| Polyaspartic acid $M_w$ 8000 |  |  |  |  | 7.5 |  |
| Carboxymethylcellulose | 0.6 | 1.3 | 0.6 | 0.4 | 0.6 | 0.6 |
| Citric acid |  | 6.8 |  |  |  | 2.5 |
| Lipase |  |  | 0.5 |  | 1.0 |  |
| Protease |  | 1.0 | 0.6 | 0.4 | 1.0 | 0.5 |
| Water | to 100 | to 100 | to 100 | to 100 | to 100 | to 100 |

TABLE 2

Compositions VII to XII are examples of the use
of the polymer obtained as in Example 1 in color detergents
These compositions are indicated in Table 2

|  | VII | VIII | IX | X | XI | XII |
|---|---|---|---|---|---|---|
| Na lauryl sulfate |  | 8.6 | 12.5 | 5.0 | 15.5 |  |
| Linear Na alkylbenzenesulfonate | 3.1 | 1.7 |  | 2.5 |  | 7.5 |
| Soap | 2.8 |  | 3.0 | 1.0 | 1.5 |  |
| $C_{13}$–$C_{15}$ oxo alcohol *3 EO |  |  |  |  | 1.5 |  |
| $C_{13}$–$C_{15}$ oxo alcohol *7 EO | 6.7 |  | 6.0 | 13.5 | 4.0 | 7.5 |
| $C_{13}$–$C_{15}$ oxo alcohol *10 EO |  | 6.3 |  |  |  |  |
| Lauryl alcohol *13 EO |  |  |  | 2.0 |  | 5.0 |
| Zeolite A | 28 | 55 | 35 |  | 37 | 18 |
| Zeolite P |  |  |  | 36 |  |  |
| SKS-6 |  |  | 12 |  |  | 25 |
| Na disilicate | 4.5 |  |  | 10.5 | 4.5 |  |
| Mg silicate | 1.0 |  | 1.0 |  | 1.0 | 1.0 |
| Sodium sulfate | 24 | 5.8 | 11.5 | 2.0 | 4.5 | 7.5 |
| Sodium bicarbonate |  |  | 6.5 | 6.5 |  |  |
| Sodium carbonate | 12.0 | 6.0 |  |  | 10.0 | 9.0 |
| Carboxymethylcellulose | 0.6 | 0.5 | 0.6 | 1.0 | 0.6 | 0.6 |
| Polymer obtained as in Example 1 | 1.0 | 0.5 | 1.0 | 1.0 | 0.5 | 0.5 |
| Copolymer 1 | 6.0 |  | 3.5 |  |  | 8.5 |
| Copolymer 2 |  | 5.0 |  |  | 7.5 |  |
| Oligomaleic acid $M_w$ 1200 |  |  |  | 4.5 |  |  |
| Soil-release polymer 1 | 1.0 |  |  |  |  | 0.5 |
| Soil-release polymer 2 |  |  | 1.0 | 0.5 |  | 0.5 |
| Sodium citrate | 2.0 | 9.0 |  |  |  | 2.5 |
| Protease | 0.5 | 1.0 | 1.0 |  | 1.0 | 1.0 |
| Cellulase | 1.0 |  | 1.0 |  | 0.8 | 1.0 |
| Water | to 100 | to 100 | to 100 | to 100 | to 100 | to 100 |

Testing of detergent compositions I to XII for color-transfer inhibition during the washing process by the first test method indicated gave washing results with various dyes (direct and reactive dyes) which were considerably better than on use of polyvinylpyrrolidone with a molecular weight of 40,000 as color-transfer inhibitor.

Test method for determining the efficacy of color-transfer inhibitors:
white cotton test fabric was washed under the conditions stated in Table 3 with the addition of the detergent indicated in Table 4 in the presence of colored cotton fabrics. The dye was detached from the cotton test dyeings during the washing process.

Table 3 contains the washing conditions for the examples. The composition of the detergent used is indicated in Table 4. The staining of the test fabric was measured by photometry. The color strengths of each of the stains on the individual test fabrics were determined from the reflectance measurements by the method described in A. Kud, Seifen, Öle, Fette Wachse, 119 (1993) 590–594. The color-transfer inhibiting effect of the test substance was determined in % from the color strength for the test with the particular test substance, the color strength for the test without test substance and the color strength of the test fabric before washing by the method described in the above reference (inhibition of color transfer is treated for this purpose similar to inhibition of redeposition). The efficacies for three different dyes are indicated in Table 5.

TABLE 3

Washing conditions

| Machine | Launder-O-meter |
|---|---|
| Cycles | 1 |
| Time | 30 min |
| Temperature | 60° C. |

TABLE 3-continued

| Washing conditions | |
|---|---|
| Water hardness | 3 mmol/l |
| Dye introduction | Dyed fabric |
| Test fabric | 2.5 g of cotton cheesecloth (bleached) |
| Amount of liquor | 250 ml |
| Detergent concentration | 4.5 g/l |

TABLE 4

| Ingredients | Amount [% by wt.] |
|---|---|
| Linear $C_{10/13}$-alkylbenzenesulfonate Na salt (50% strength) | 8.6 |
| Fatty alcohol sulfate Na salt | 2.7 |
| Adduct of 10 mol of ethylene oxide with 1 mol of $C_{13/15}$ oxo alcohol | 6.3 |
| Zeolite A | 55 |
| Na citrate · 5.5 $H_2O$ | 9.0 |
| Copolymer of 70% by weight acrylic acid and 30% by weight maleic acid, molecular weight 70,000 | 4.0 |
| Na carbonate | 6.0 |
| Na sulfate | 5.8 |
| Carboxymethylcellulose | 0.5 |
| Polymer (color-transfer inhibitor) | 1.0 |

The washing results with the polymers according to the invention of Examples 1–3 are shown in Table 5.

TABLE 5

| | Color-transfer inhibiting effect in % | | |
|---|---|---|---|
| Polymer prepared in | Direct orange 39 | Direct black 22 | Direct black 51 |
| Example 1 | 57.4 | 58.3 | 65.4 |
| Example 2 | 53.7 | 49.8 | 58.0 |
| Example 3 | 52.3 | 66.9 | 66.2 |
| Polyvinylpyrrolidone with K value 30 | 11.2 | 50.1 | 11.6 |
| Comparative Example 2 | 20.1 | 47.5 | 34.7 |

The washing results in Table 5 show that the polymers according to the invention are very effective color-transfer inhibitors and are in many cases distinctly superior to the color-transfer inhibitor polyvinylpyrrolidone which is often employed in detergents (comparative example; K value measured by the method of H. Fikentscher in aqueous solution at 25° C. with a polymer concentration of 1%). The results additionally show that the color-transfer inhibiting effect occurs with many dyes and is not confined to individual dyes.

We claim:

1. A porous polymer which is in powder form and contains N-vinylimidazole units, which is obtained by free-radical precipitation polymerization of a) 5–100% by weight of a monomer selected from the group consisting of at least one N-vinylimidazole monomer of the formula

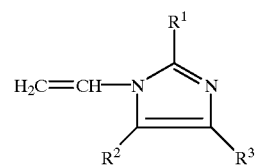

(I)

where $R^1$, $R^2$ and $R^3$ are identical or different and are H, $C_1$–$C_4$-alkyl, monomers of the formula

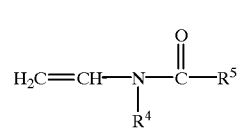

(II)

where $R^4$ and $R^5$ are identical or different and together form a ring of 3 to 5 methylene groups, N-vinylaxazolidone, N-vinyltriazole, 4-vinylpyridine N-oxide and mixtures of said monomers, b) 0–95% by weight of other copolymerizable monoethylenically unsaturated monomers selected from the group consisting of a (meth acrylic ester, a (meth) acrylamide, a vinyl ester, an unsaturated carboxylic acid, an acrylic ester which has a basic nitrogen atom, 2-vinylpyridine and 4-vinylpyridine; and c) 0–50% by weight of at least one monomer with at least two non-conjugated ethylenic double bonds in aqueous solution which contains 0.5–30% by weight of at least one electrolyte and, based on the monomers employed, 0.5–80% by weight of at least one surfactant.

2. A porous polymer which is in powder form and contains N-vinylimidazole units as claimed in claim 1, wherein the monomers employed in the polymerization are a) N-vinylimidazole or mixtures of N-vinylimidazole and N-vinylpyrrolidone and c) at least one monomer with at least two non-conjugated ethylenic double bonds.

3. A porous polymer which is in powder form and contains N-vinylimidazole units as claimed in claim 1, wherein alkali metal, alkaline earth metal, ammonium or aluminum salts or mixtures of such salts are employed as electrolyte.

4. A process for preparing a porous polymer which is in powder form and contains N-vinylimidazole units as claimed in claim 1, which comprises polymerizing a) 5–100% by weight of at least one N-vinylimidazole monomer of the formula

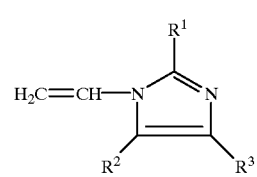

(I)

where $R^1$, $R^2$ and $R^3$ are identical or different and are H, $C_1$–$C_4$-alkyl, monomers of the formula

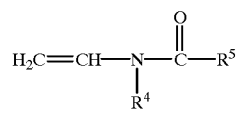

where $R^4$ and $R^5$ are identical or different and together form a ring of 3 to 5 methylene groups, and optionally additional monomers selected from the group consisting of N-vinylaxazolidone, N-vinyltriazole, 4-vinylpyridine N-oxide and mixtures of said monomers, b) 0–95% by weight of other copolymerizable monoethylenically unsaturated monomers selected from the group consisting of a (meth)acrylic ester, a (meth)acrylamide, a vinyl ester, an unsaturated carboxylic acid, an acrylic ester which has a basic nitrogen atom, 2-vinylpyridine and 4-vinylpyridine; and c) 0–50% by weight of at least one monomer with at least two non-conjugated ethylenic double bonds in a precipitation polymerization in the presence of free-radical initiators in aqueous solutions which contains 0.5–30% by weight of at least one electrolyte and, based on the monomers employed, 0.5–80% by weight of at least one surfactant.

5. A process as claimed in claim 4, wherein the polymerization is carried out in aqueous solutions which contain 1–25% by weight of an electrolyte selected from the group consisting of sodium sulfate, sodium carbonate, sodium bicarbonate and mixtures thereof.

6. A process as claimed in claim 4, wherein adducts of ethylene oxide and/or propylene oxide with $C_{10}$–$C_{30}$-alcohols, $C_1$–$C_{18}$-alkylphenols, fatty amines containing at least 12 carbon atoms, fatty acids containing at least 10 carbon atoms, sucrose esters, sorbitan esters, (poly)glycerol esters or alkyl (poly)glycosides with 8–22 carbon atoms in the alkyl chain, or mixtures of said compounds, are employed as surfactant.

7. A process as claimed in claim 4, wherein the surfactants are employed in amounts of from 1 to 60% by weight.

8. A method for inhibiting color transfer during a washing process comprising:

adding a porous polymer which is in powder form and contains N-vinylimidazole units as claimed in claim 1 to a phosphate-free or a reduced phosphate detergent.

9. The polymer of claim 1, wherein said monomer of formula (II) is selected from the group consisting of N-vinylpyrrolidone, N-vinylpiperidone and N-vinylcaprolactam.

10. The process of claim 4, wherein said monomer of formula (II) is selected from the group consisting of N-vinylpyrrolidone, N-vinylpiperidone and N-vinylcaprolactam.

* * * * *